United States Patent [19]

Ohmi

[11] 4,060,053

[45] Nov. 29, 1977

[54] APPARATUS FOR DISPENSING CAP LINING MATERIAL

[75] Inventor: Hidehiko Ohmi, Komaki, Japan

[73] Assignee: Japan Crown Cork Co., Ltd., Tokyo, Japan

[21] Appl. No.: 736,185

[22] Filed: Oct. 27, 1976

[30] Foreign Application Priority Data

Feb. 16, 1976 Japan .................................. 51-14824

[51] Int. Cl.$^2$ ........................ B05C 7/00; B29D 31/00; B29F 3/00

[52] U.S. Cl. ........................................ 118/215; 83/324; 83/593; 425/295; 425/311; 425/809

[58] Field of Search ........................ 118/215, 254, 243; 83/183, 324, 593; 425/311, 313, 809, 295

[56] References Cited

U.S. PATENT DOCUMENTS

| | | | |
|---|---|---|---|
| 2,053,030 | 9/1936 | Hall | 83/593 |
| 3,590,678 | 7/1971 | Hasten | 83/593 |
| 3,782,329 | 1/1974 | Everett | 118/215 |
| 3,867,081 | 2/1975 | Everett | 425/295 |

*Primary Examiner*—Louis K. Rimrodt
*Attorney, Agent, or Firm*—Wenderoth, Lind & Ponack

[57] ABSTRACT

An apparatus for dispensing predetermined amounts of lining material into cap shells, particularly of the deeply recessed type, includes a conveyor including a passage for conveying cap shells at predetermined speeds, an extruder provided above and along the shell-conveying passage for extruding predetermined quantities of a lining material through a discharge passage, a blade fitted adjacent to the exit end of the discharge passage and rotatably across it for cutting the lining material, and a drive for rotating the blade in response to the conveying of the cap shells. The drive is adapted to rotate the blade at a non-uniform speed in response to the speed of shell conveyance so that its speed gradually decreases as the exterior end of the blade in its radial direction approaches the shell-conveying passage, and gradually increases as it departs from it, whereby collision between the tip of the blade and the cap shells can be completely avoided.

4 Claims, 6 Drawing Figures

APPARATUS FOR DISPENSING CAP LINING MATERIAL

This invention relates to an apparatus for dispensing a cap lining material, and more specifically, to an apparatus for dispensing predetermined quantities of a lining material accurately into caps or crowns, even in caps of the type in which the height of the skirt is relatively large with respect to the cap diameter (that is, deeply recessed caps).

An apparatus for dispensing predetermined amounts of lining material into cap shells was previously proposed and includes a conveyor including a passage for conveying cap shells at predetermined speeds, an extruder provided above and along the shell-conveying passage for extruding predetermined quantities of a lining material through a discharge passage, a blade fitted adjacent to the exit end of the discharge passage and rotatably across it for cutting the lining material, and a drive for rotating the cutting blade in response to the conveying of the cap shells (see, for example, Japanese Pat. Publication No. 20759/67).

The prior art dispensing apparatus, however, has the defect that when it is applied to deeply recessed caps, the exterior end of the cutting blade in its radial direction makes contact with the skirt portion of the cap because the blade is rotated at a uniform speed, and therefore, no satisfactory operation can be secured.

One method for removing such a defect was suggested in U.S. Pat. No. 3,782,329 to George Everett which discloses that a cam is fitted to the cutting blade so as to cause the blade to have a vertical motion with respect to the cap conveyor passage in addition to its rotating motion. Since, however, the cam follower pin used in this method undergoes heavy wear, the apparatus is difficult to operate at high speeds, and is unsuitable for commercial mass production.

SUMMARY OF THE INVENTION

It is an object of this invention to provide an improved apparatus which can dispense predetermined quantities of a lining material accurately and at high speeds into cap shells, even into deeply recessed cap shells, so that the charge is deposited centrally in the interior of each cap shell.

Other objects and advantages of the invention will become apparent from the following description.

The present invention provides an apparatus for dispensing predetermined amounts of lining material into cap shells, the apparatus including a conveyor including a passage for conveying cap shells at predetermined speeds, an extruder provided above and along the shell-conveying passage for extruding predetermined quantities of a lining material through a discharge passage, a blade fitted adjacent to the exit end of the discharge passage and rotatably across it for cutting the lining material, and a drive for rotating the blade in response to the conveying of the cap shells. The drive is adapted to rotate the blade at a non-uniform speed in response to the speed of shell conveyance so that the blade speed gradually decreases as the exterior end of the blade in its radial direction approaches the shell-conveying passage and gradually increases as it departs therefrom.

BRIEF DESCRIPTION OF THE DRAWINGS

The apparatus of this invention is described below with reference to preferred embodiments shown in the accompanying drawings in which.

DETAILED DESCRIPTION OF THE INVENTION

The constituent elements of the apparatus of the invention are the same in principle as the cap liner dispensing apparatus disclosed in Japanese Pat. Publications Nos. 5588/66 and 20759/67 and U.S. Pat. No. 3,782,329 except the means for driving the blade. Accordingly, for a detailed description of the other constituent parts, the specifications of the above-cited patents may be referred to, and only their basic structures are described briefly in the present application.

Figure 1:
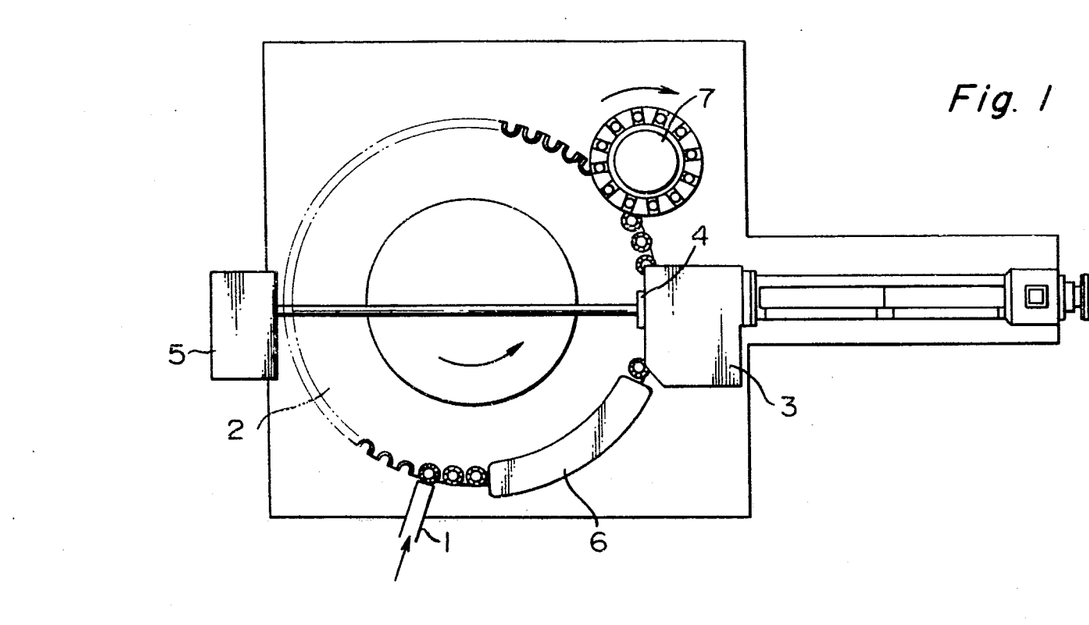
FIG. 1 is a simplified top plan view of an entire apparatus in accordance with this invention.
Figure 2:
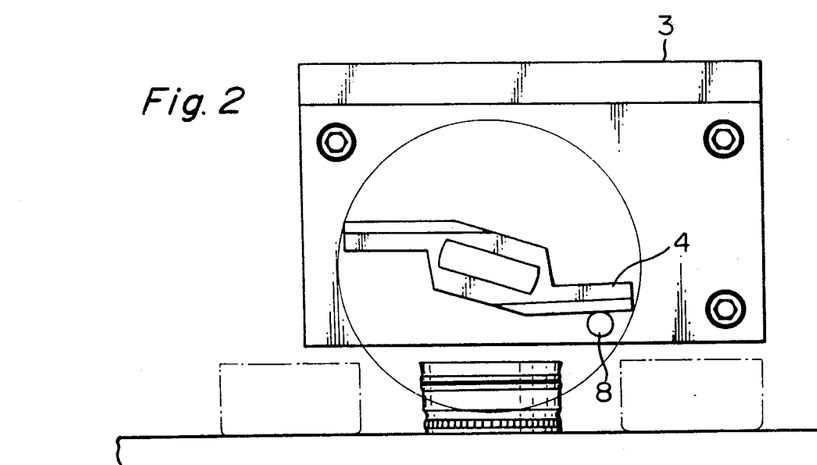
FIG. 2 is an enlarged view showing the liner material dispensing section of the apparatus shown in FIG. 1.

As shown in FIGS. 1 and 2, the apparatus of this invention generally includes a cap shell-conveying means 2 for conveying at predetermined speeds cap shells fed from a cap chute 1, an extruder means 3 provided above and along the cap shell-conveying passage for heat-melting predetermined quantities of a lining material and extruding the molten liner material through a discharge passage, a blade 4 fitted adjacent to the exit end 8 of the discharge passage and rotatably across it for cutting the lining material, and a drive means 5 for rotating the blade 4 in response to the conveying of the cap shells on conveyor means 8. If desired, a cap shell heating means 6 may be provided between the cap chute 1 and the extruder means 3 on the conveyor means 2.

The caps having the liner material dispensed into the cap recesses are supplied to a molding station 7, where the lining material is molded into the desired shape.

In the prior art apparatus, the blade is rotated at a uniform speed. Difficulties, as described below, will be encountered when dispensing lining material into deeply recessed caps using such a blade rotating at a uniform speed.

Figure 3:
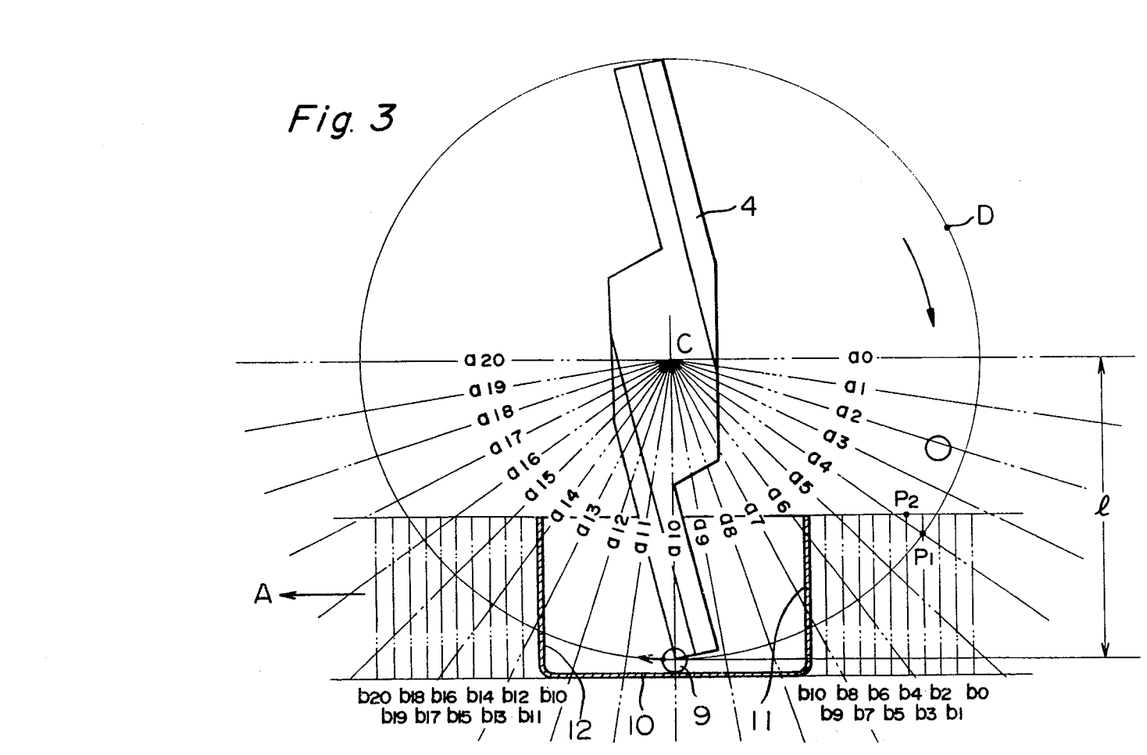
FIG. 3 is a view illustrating collision between a blade and a cap shell when the blade is rotated at a uniform speed.

The dispensing operation using blade 4 rotating at a uniform speed is illustrated in FIG. 3. A cap shell 10 into which a predetermined quantity of a lining material 9 is to be dispensed so as to be deposited centrally onto the inside bottom of the cap shell is conveyed at a predetermined speed in the direction of arrow A by the coneyor means 2. the cap sheel 10 is moved at a predetermined speed from the position shown by two-dotted chain line $b_0$ where the rearmost part 11 of the skirt is situated to the position shown by a solid line where the center of the cap shell is located immediately beneath the central axial line C of rotation of the blade 4 via the positions shown by two-dotted chain lines, $b_1, b_2, \ldots b_9$. Thence, the cap shell is further moved at a predetermined speed so that the foremost part 12 of the skirt reaches the positions shown by two-dotted chain lines $b_{11}, b_{12}, \ldots$ In the meanwhile, the blade 4 is rotated at a uniform speed from the position shown by a two-dotted chain line $a_0$ to the position shown by solid line via the positions shown by two-dotted chain lines $a_1, a_2, \ldots a_9$. It is further rotated to the positions shown by two-dotted chain lines $a_{11}, a_{12}, \ldots$ In order to accurately dispense a predetermined amount of lining material 9 extruded from the end 8 of the discharge passage of the extruder means 3 and cut by the blade 4 into the central part of the inside bottom of the shell, the tip of the blade 4 in its radial direction needs to extend to a point near the bottom surface of the shell at the position shown by the solid line. In other words, it is necessary that the blade 4 should extend by length $l$ from the central axial line C of rotation of the blade. In this case, the tip of the blade 4 in its radial direction draws the locus D shown in FIG. 3 when the blade is rotated at a uniform speed in response to the conveying of the cap shell. Thus, when the blade 4 is moved to the position shown by two-dotted chain line $a_4$ and the shell 10 to the position shown by two-dotted chain line $b_4$, the tip of the blade 4 in its radial direction is moved to the position shown by point $P_1$, and the upper end of the rearmost part of the shell skirt is moved to the position shown by point $P_2$. It will be readily appreciated that in such a situation, the tip of the blade 4 in its radial direction collides with the upper end of the rearmost part of the skirt of the shell 10, before the displacement of the blade 4 to the position shown by two-dotted chain line $a_4$ and the movement of the cap shell 10 to the position shown by two-dotted chain line $b_4$ take place. Accordingly, the conventional apparatus in which the blade is rotated at a uniform speed is designed for application to caps of shallow recessess such as crown shells. When such an apparatus is applied to deeply recessed caps, the length of the blade from its rotating central axial line C to its tip in the radial direction direction should be made much shorter than $l$. Thus, as disclosed in the specification of U.S. Pat. No. 3,782,329, a predetermined amount of the lining material 9 cannot be dispensed accurately into the desired position at the inside bottom of the cap shell unless the blade is rotated and at the same time moved vertically with respect to the cap shell conveyor passage.

In the apparatus shown in this U.S. patent, the blade must be positively caused to move up and down while it is rotating. This results in considerably heavy loads on the cam follower pin, and causes the heavy wear of the cam follower. Or as a result, it is difficult to rotate the blade at high speeds. Because of these defects, the apparatus is not satisfactory for practical purposes.

The rotation of the blade at uniform speeds also presents the following difficulties. Generally, because of machine design, the blade is rotated at such a rotating speed that its peripheral speed, that is, the moving speed of its exterior end in the radial direction, becomes much higher than the moving speed of the cap shell. when the blade 4 is further moved to the positions shown by two-dotted chain lines $a_{11}, a_{12}, \ldots$ from the condition shown in FIG. 3 by the solid line (the condition in which the exterior end of the blade in its radial direction has approached the cap shell most closely), the lining material 9 which has been pressed against, and thus dispensed into, the central part of the inside bottom surface of the cap shell may move in the direction shown by the arrow in FIG. 3 owing to the difference between a component in the cap shell-conveying direction of the moving speed of the exterior end of the blade 4 in its radial direction (in the condition shown by the solid line, the moving speed of the blade 4 is only the component in the shell-conveying direction) and the moving speed of the cap shell. When the blade is rotated at very high speeds, the liner material dispensed may come out of the cap shell.

Figure 4:
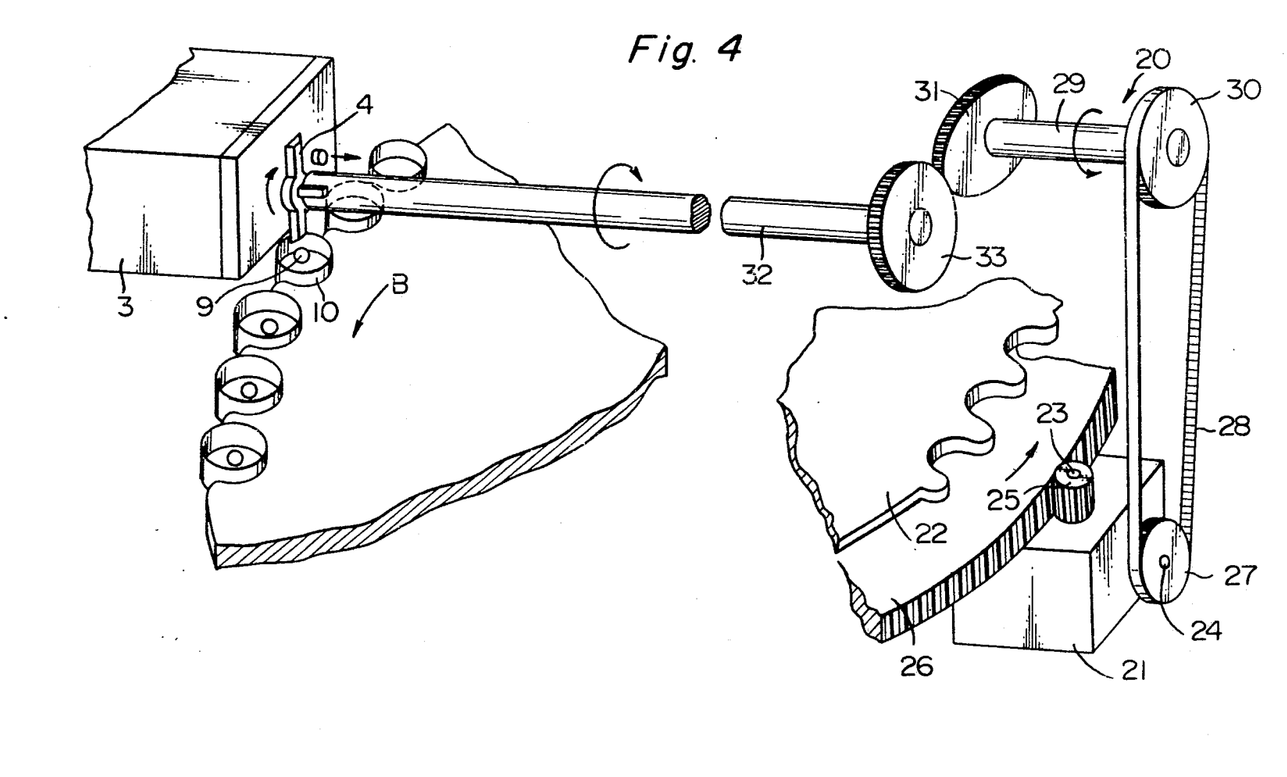
FIG. 4 is a partly broken-away perspective view of the blade driving means of the apparatus shown in FIG. 1.

The present inventors have found that the collision between the blade and the cap shell skirt can be avoided, without shortening the length of the blade from its central axial line of rotation to its tip, by gradually decreasing the rotating speed of the blade when the tip of the blade in its radial direction is moved close to the shell-conveying passage via the positions shown by two-dotted chain lines $a_0$ $a_1$, $a_2$, and gradually increasing it when the tip of the blade in its radial direction is rotated from the position shown by the solid line in FIG. 3 to the positions shown by two-dotted chain lines $a_{11}, a_{12}, a_{13}, \ldots$ Referring to FIG. 4, an embodiment of the drive means for rotating the blade 4 at a non-uniform speed is described below in detail. The drive means generally designated at 20 includes a speed reduction mechanism 21 such as a reduction gear box whose input shaft is connected to an output shaft of an electric motor (not shown). The reduction mechanism 21 has a first output shaft 23 for rotating a turret 22 which conveys cap shells at predetermined speeds and a second output shaft 24 for rotating the blade 4. A gear 25 is fixed to the first output shaft 23, and comes into engagement with a rotatably disposed gear 26. The turret 22 is connected to the gear 26 and adapted to rotate therewith. Accordingly, the turret 22 is rotated at a predetermined speed in the direction of arrow B by a motor (not shown) via the first output shaft 23 of the reduction system 21, the gear 25 and the gear 26.

On the other hand, a timing pulley 27 is secured to the output shaft 24 of the reduction system 21. The timing pulley 27 is drivingly connected to a timing pulley 30 fixed to one end of a transmission shaft 29 rotatably supported by a suitable bearing means (not shown) through a timing belt 28. To the other end of the transmission shaft 29 is secured a first non-circular gear 31 which meshes with a second non-circular gear 33 having the same configuration and number of teeth as the first non-circular gear 31 and fixed to one end of a blade support shaft 32 rotatably supported by a suitable bearing means (not shown). The blade 4 is fixed to the other end of the blade support shaft 32 so that it is adjacent to the exit end of the discharge passage of the extruder means 3 and is rotatable across it. Accordingly, the blade support shaft 32 (therefore, the blade 4) is rotated by a motor (not shown) via the second output shaft 24 of the reduction mechanism 21, the timing pulleys 27 and 30, the timing belt 28, the transmission shaft 29, the first non-circular gear 31, and the second non-circular gear 33. Meshing of the first non-circular gear 31 and the second non-circular gear 33 cause the rotation of transmission shaft 29 at a uniform speed to be converted to the desired non-uniform speed rotation, and this is transmitted to the blade support shaft 32 to thereby rotate the blade 4 at the non-uniform speed.

Figure 5:
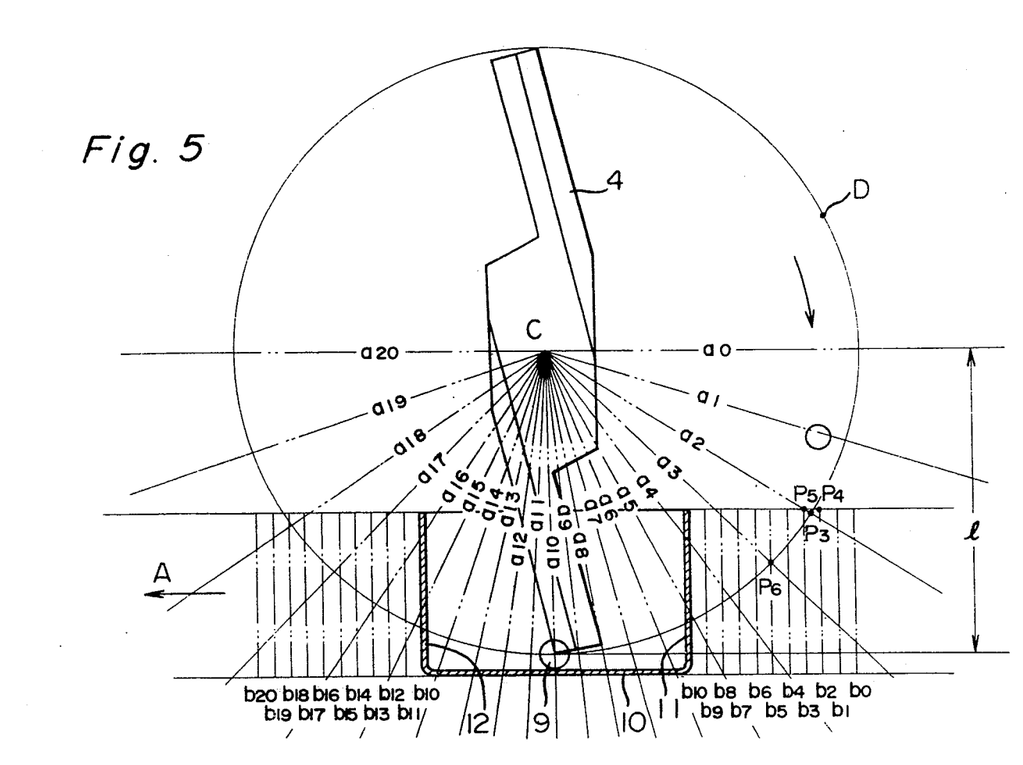
FIG. 5 is a view, similar to FIG. 3, illustrating the avoidance of collision between the blade and the cap shell when the blade is rotated at a non-uniform speed.

When, for example, non-circular gears having a module M of 2, an oblateness degree $\epsilon$ [the ratio of (long diameter − short diameter)/(long diameter + short diameter)] of 0.331, and a number of teeth N of 42 are used as the first and second non-circular gears, the blade 4 can be rotated at a non-uniform speed as shown in FIG. 5. Now, referring to FIG. 5, the rotation of the blade at non-uniform speeds is described. The rotating speed of the blade is gradually decreased as its tip in the radial direction approaches the cap shell conveying passage (that is, when it is rotated from the position shown by two-dotted chain line $a_0$ to the position shown by solid line via the positions shown by two-dotted chain lines $a_1, a_2, \ldots$), and is gradually increased as its tip in the radial direction departs from the cap shell conveying passage (that is, when it is rotated from the position shown by the solid line to the positions shown by two-dotted chain lines $a_{11}, a_{12}, \ldots$). Thus, when the blade 4 is rotated to the position shown by two-dotted chain line $a_2$ and the cap shell 10 is moved to the position shown by two-dotted chain line $b_2$, the tip of the blade 4 moves to point $P_3$ and the upper end of the rearmost part of the skirt of the shell 10 to point $P_4$. When the blade is rotated to the position shown by two-dotted chain line $a_3$ and the cap shell 10 is moved to the position shown by two-dotted chain line $b_3$, the tip of the cutting blade is moved to point $P_4$, and the upper end of the rearmost part of the skirt of the shell 10 to point $P_5$. In this way, the collision between the blade 4 and the cap shell 10 can be completely avoided.

The speed reduction and acceleration of the blade 4 are performed preferably in such a manner that when the blade 4 approaches the cap shell conveying passage, a component in the cap shell conveying direction of the moving speed of the exterior end of the blade 4 in the radial direction becomes substantially equal to the moving speed of the cap shell. This can lead to the prevention, even at high blade rotating speeds, of the displacement of the lining material 9 in the cap shell which, as described hereinabove, is due to the difference between the moving speed of the cap shell and a component in the shell conveying direction of the moving speed of the blade 4. Since the displacement of the lining material within and from the cap shell can be so prevented, it is preferred to rotate the blade 4 at non-uniform speeds even when the cap shell has a relatively shallow recess and no collision occurs between the blade and the cap shell (for example, when a crown shell is used).

The collision between the blade and the cap shell, as described with reference to FIG. 3, can be completely avoided by rotating the blade 4 at a non-uniform speed using the drive means containing non-circular gears.

Where the configuration of the cap shell differs from that shown in FIGS. 3 and 5 and the depth is larger with respect to its diameter, the rate of decrease or increase of the rotating speed of the blade is varied by using non-circular gears having module, oblateness degree and numbers of teeth different from those described above, whereby collision between the cutting blade and the cap shell can be avoided. Those skilled in the art will understand how to easily change the rate of variation of the rotating speed of the blade. If a certain set of non-circular gears is selected, the pattern of rotation of the blade, such as that shown in FIG. 5, can be mathematically formulated, or diagrammed. Hence, the presence or absence of collision between the blade and the cap shell can be known from the numerical formula or diagram obtained. From the information obtained, those skilled in the art can judge whether the set of non-circular gears is conformable to the intended cap shell, and consequently select a combination of non-circular gears conforming to the intended cap shell.

The present inventors, however, discovered that irrespective of the shape of a cap shell, collision between the blade and the cap shell can be avoided by controlling the rotating speed of the blade and its decrease or increase in such a manner that a component in the cap shell conveying direction of the moving speed of the tip of the blade does not substantially change and becomes equal to the conveying speed of the cap shell when the tip of the blade moves toward and away from the cap shell conveying passage.

Figure 6:
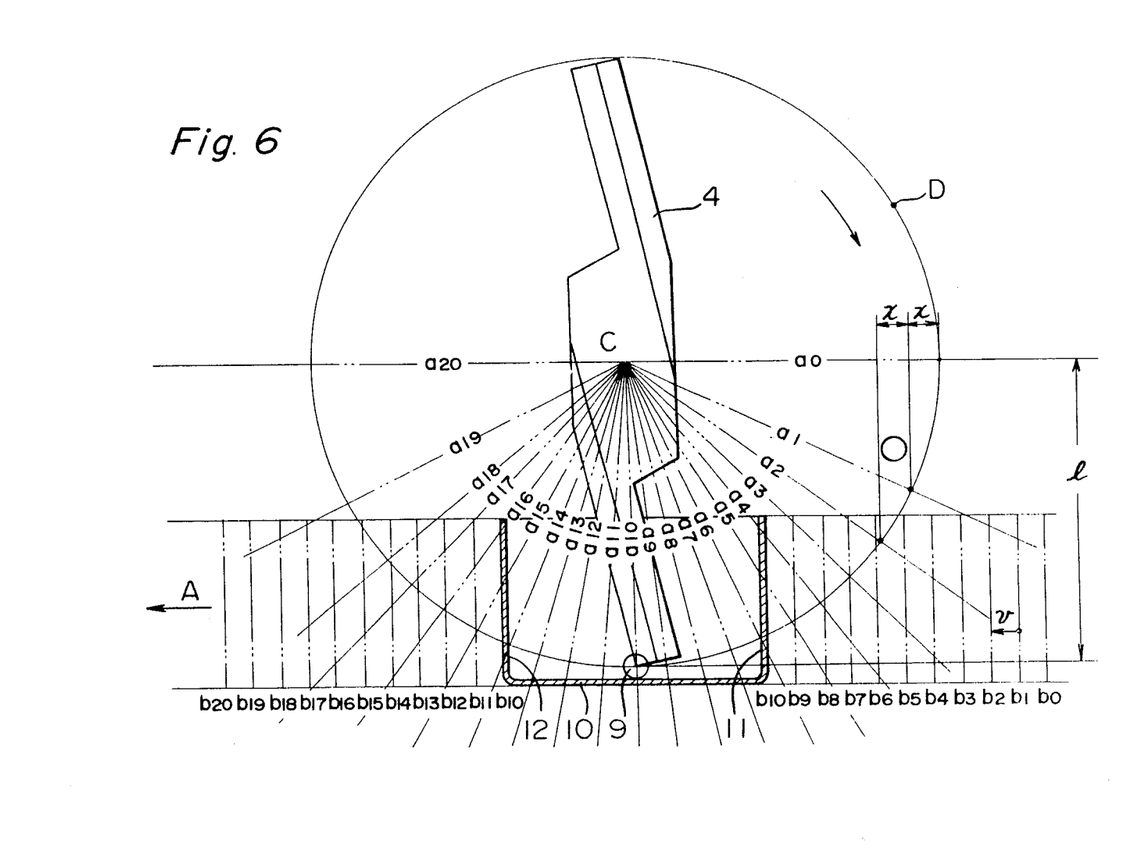
FIG. 6 is a view, similar to FIGS. 3 and 5, illustrating the case where a component in the shell-conveying direction of the moving speed of the tip of the blade remains substantially unchanged and is substantially equal to the shell-conveying speed.

FIG. 6 shows the relationship between the cutting blade 4 and the cap shell 10 when the rotating speed and its decrease and increase are controlled as mentioned above. In FIG. 6, when the blade 4 is rotated from the position shown by two-dotted chain line $a_1$ to the position shown by the solid line via the positions shown by two-dotted chain lines $a_2, a_3, \ldots$, and thence to the positions shown by two-dotted chain lines $a_{11}, a_{12}, \ldots$, a component in the cap shell conveying direction of the moving speed of the blade tip, that is, component $(x)$ in the direction shown by arrow A in FIG. 6, does not substantially change, and is substantially equal to the conveying speed $(v)$ of the cap shell. It will be readily understood from FIG. 6 that in this situation, collision between the blade and the cap shell can be avoided irrespective of the configuration of the shell.

While the invention has been described in detail hereinabove in relation to some preferred embodiments, it is to be understood that the invention is not limited thereto, but various changes and modifications are possible without deparing from the spirit and scope of the invention.

For example, while the invention has been described in relation to drive means for rotating the blade at non-uniform speeds utilizing non-circular gears, it will be obvious that the desired rotation of the blade at non-uniform speeds can also be achieved by drive means which utilizes a special link mechanism or a special cam mechanism in place of the non-circular gears.

What we claim is:

1. An apparatus for dispensing predetermined amounts of lining material into cap shells, said apparatus comprising:
   conveyor means including a passage for conveying cap shells at predetermined speeds;
   extruder means provided above and along the shell-conveying passage for extruding a predetermined quantity of a lining material through a discharge passage into each cap shell;
   a blade positioned adjacent the exit end of said discharge passage and adapted to rotate across said exit end for cutting said lining material into said predetermined quantity; and
   drive means for rotating said blade at a non-uniform speed in response to the speed of conveyance of said cap shells such that the speed of said blade gradually decreases as the exterior end of said blade in its radial direction approaches said shell-conveying passage, and such that the speed of said blade gradually increases as said exterior blade end moves away from said shell-conveying passage.

2. An apparatus as claimed in claim 1, wherein said drive means comprises means for rotating said blade at a non-uniform speed such that a component in the cap shell-conveying direction of the moving speed of said exterior end of said blade becomes substantially equal to the moving speed of said cap shell when said exterior end of said blade approaches said cap shell.

3. An apparatus as claimed in claim 1, wherein said drive means comprises means for rotating said blade at a non-uniform speed such that a component in the cap shell-conveying direction of the moving speed of said exterior end of said blade becomes substantially equal to the moving speed of said cap shell when said exterior end of said blade moves toward and away from said cap shell-conveying passage.

4. An apparatus as claimed in claim 1, wherein said drive means comprises a drive motor, a first non-circular gear connected to a rotating output shaft of said drive motor, and a second non-circular gear connected to said blade and in meshing engagement with said first non-circular gear.

* * * * *